United States Patent [19]

Maeda

[11] Patent Number: 4,914,643

[45] Date of Patent: Apr. 3, 1990

[54] OVERWRITING PHOTOMAGNETIC RECORDING APPARATUS HAVING SINGLE LIGHT SOURCE AND FIXED-FIELD GENERATOR

[75] Inventor: Ikuo Maeda, Kawasaki, Japan

[73] Assignee: Ricoh Company, Ltd., Tokyo, Japan

[21] Appl. No.: 122,444

[22] Filed: Nov. 19, 1987

[30] Foreign Application Priority Data

Nov. 20, 1986 [JP] Japan .................. 61-277732

[51] Int. Cl.$^4$ .............. G11B 11/12; G11B 13/04
[52] U.S. Cl. ....................... 369/13; 360/114; 360/59
[58] Field of Search ............. 369/13; 360/114, 59, 360/57; 365/122

[56] References Cited

U.S. PATENT DOCUMENTS

| | | | |
|---|---|---|---|
| 4,543,586 | 9/1985 | Parker | 360/59 |
| 4,610,009 | 9/1986 | Connell | 369/13 |
| 4,706,232 | 11/1987 | Funada et al. | 365/122 |
| 4,771,347 | 9/1988 | Horimai et al. | 360/59 |

FOREIGN PATENT DOCUMENTS

| | | | |
|---|---|---|---|
| 57-78653 | 5/1982 | Japan . | |
| 59-152502 | 8/1984 | Japan | 369/13 |
| 60-07635 | 1/1985 | Japan | 369/13 |
| 60-10401 | 1/1985 | Japan | 369/13 |
| 61-96540 | 5/1986 | Japan | 360/114 |
| 61-188758 | 8/1986 | Japan | 369/13 |
| 61-192048 | 8/1986 | Japan | 369/13 |
| 61-278058 | 12/1986 | Japan | 360/114 |
| 62-01148 | 1/1987 | Japan | 369/13 |
| 62-33351 | 2/1987 | Japan | 360/114 |

Primary Examiner—Steven L. Stephan
Assistant Examiner—Hoa T. Nguyen
Attorney, Agent, or Firm—Oblon, Spivak, McClelland, Maier & Neustadt

[57] ABSTRACT

An overwriting recorder includes a light intensity modulator for modulating a semiconductor laser beam with a signal to be recorded to obtain a light intensity corresponding to the signal, and at least one fixed-field generator for applying magnetic fields in mutually opposite directions to the disk at two respective positions thereon which are determined by the light intensity of the modulated laser beam. Information can be overwritten on the disk through light modulation.

8 Claims, 4 Drawing Sheets

OVERWRITING PHOTOMAGNETIC RECORDING APPARATUS HAVING SINGLE LIGHT SOURCE AND FIXED-FIELD GENERATOR

BACKGROUND OF THE INVENTION

The present invention relates to an overwriting recorder for use in a photomagnetic recording apparatus capable of simultaneously erasing and writing information signals.

There have already been known photomagnetic recording apparatus capable of simultaneously erasing and writing information signals. One of the conventional photomagnetic recording apparatus employs an overwriting system operating on magnetic field modulation. In such an overwriting system, however, it is highly difficult to effect high-speed modulation as it would require an impractically large-size apparatus. Another type of conventional photomagnetic recording apparatus uses two laser beams one for erasing stored information and the other for writing new information. According to the latter arrangement, the optical systems used are complex because of the requirement of the two laser beams and must be synchronized with each other. The apparatus employing two laser beams may not come under the strict definition of "overwriting" since the erasing and writing units are different from each other.

SUMMARY OF THE INVENTION

It is an object of the present invention to provide an overwriting recorder for use in a photomagnetic recording apparatus wherein light modulation capable of high-speed modulation is employed and a single laser beam is used to both erase and write information signals, the overwriting recorder being simple in construction, small in size, light in weight, and easy to adjust.

According to the present invention, an overwriting recorder for use in a photomagnetic recording apparatus includes a light intensity modulator for modulating a semiconductor laser beam with a signal to be recorded to obtain a light intensity corresponding to the signal; and at least one fixed-field generator for applying magnetic fields in mutually opposite directions to the disk at two respective positions thereon which are determined by the light intensity of the modulated laser beam.

Since information can be overwritten on the disk through light modulation, high-speed modulation of the laser beam is made possible. While the directions of magnetization of the disk are determined at two positions, since the direction of magnetization between the two positions is actually determined by the intensity of light at a spot where the laser beam is applied to the disk, the overwriting of information can be carried out by a single laser beam. Consequently, focusing and tracking servo control can be performed only by a single optical system. The overwriting recorder is simple in structure, small in size, light in weight, and easy to adjust.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

As shown in FIG. 1, a laser beam 12 emitted from a semiconductor laser (not shown) is focused by an objective lens 11 onto a photomagnetic disk 10. When the laser beam 12 is applied to the photomagnetic disk 10, the temperature of an area of the disk 10 where the laser beam 12 is applied is increased. FIG. 1(a) shows such a temperature rise on the surface of the disk 10. When the light intensity of the laser beam 12 is I1, the disk temperature rises to T1, and when light intensity of the laser beam 12 is I2, the disk temperature rises to T2 (I1<I2).

Figure 1C:
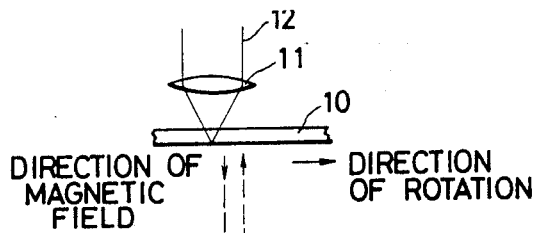
FIG. 1(a-e) are diagrams explanatory of the principles of an overwriting recorder in a photomagnetic recording apparatus according to the present invention.
Figure 1C:
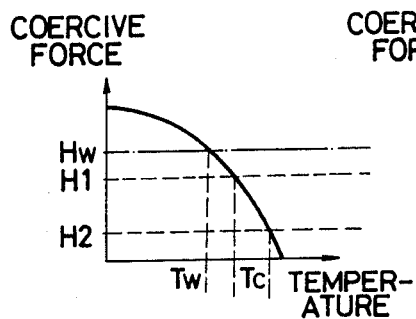
Figure 1D:
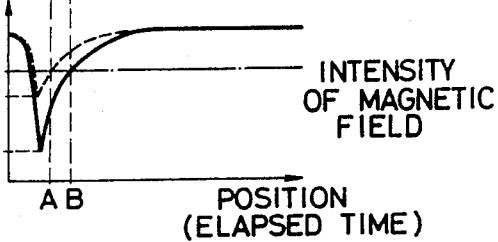
Figure 1B:
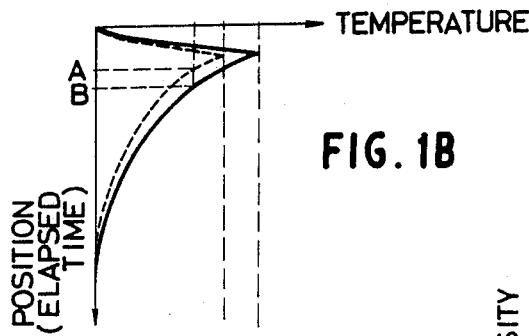
Figure 1A:
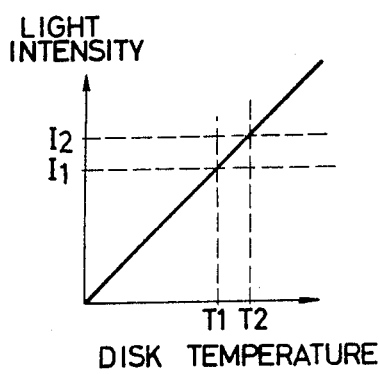

If the disk 10 is irradiated with a laser beam having the light intensity I1, the temperature of the disk 10 at the area where the focused spot of the laser beam is applied is increased to T1 and then is lowered exponentially as the disk 10 is moved, i.e., rotated and cooled with time that has elapsed. The coercive force of the disk 10 is dependent on the temperature of the disk 10 and hence varies as the temperature varies as illustrated in FIG. 1(c). The coercive force is lowered as the disk temperature rises. Therefore, the relationship between the position (i.e., the distance the disk is moved) and the temperature, as shown in FIG. 1(b), can be rewritten according to the curve of FIG. 1(c) as the relationship between the position and the coercive force, as shown in FIG. 1(d). Denoted at H1 is the coercive force at the temperature T1.

When a magnetic force Hw directed downwardly in FIG. 1 is applied to the disk 10, the disk 10 is magnetized downwardly in the area where H1<Hw. In the area where H1>Hw, the disk 10 is not influenced by the magnetic field and remains as before. More specifically, the direction of magnetization of the disk 10 is determined at a position A in which the dotted-line curve indicative of the coercive force and the dot-and-dash-line curve indicative of the magnetic field Hw intersect with each other, as shown in FIG. 1(d). In the position A, the disk 10 is magnetized downwardly.

When the disk 10 is irradiated with a laser beam having the light intensity I2 greater than the light intensity I1, the temperature and the coercive force vary as indicated by the solid lines, and hence the direction of magnetization is determined at a position B as shown in FIG. 1(d). Thus, the disk 10 is magnetized upwardly by applying an upward magnetic field thereto at the position B.

Actually, the disk is magnetized downwardly at the position A. Since the intensity of the magnetic field is greater than the coercive force, however, the disk becomes magnetized upwardly after leaving the position A and until arriving at the position B. The direction of magnetization is determined at the position B.

Figure 1E:
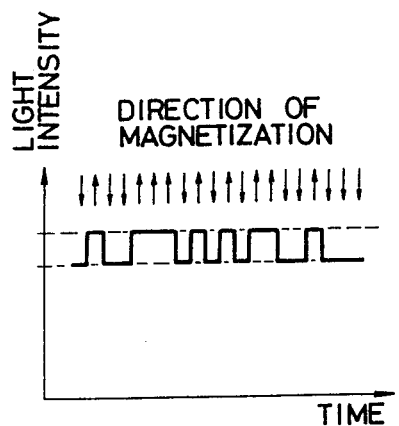

As described above, the direction of magnetization is determined at the position A when the laser beam applied is of the light intensity I1, and determined at the position B when the laser beam applied is of the light intensity I2. Consequently, by applying fixed magnetic fields in opposite directions at the positions A and B, respectively, information signals can be overwritten simply by modulating the light intensity of the laser beam. FIG. 1(e) shows, by way of example, the modulated light intensity and the directions of magnetization.

It is not necessary to equalize the intensity of the magnetic field Hw at the positions A, B.

FIGS. 2 through 6 show overwriting recorders according to various embodiments of the present invention. Like or corresponding parts are denoted by like or corresponding reference numerals througout these views.

Figure 2:
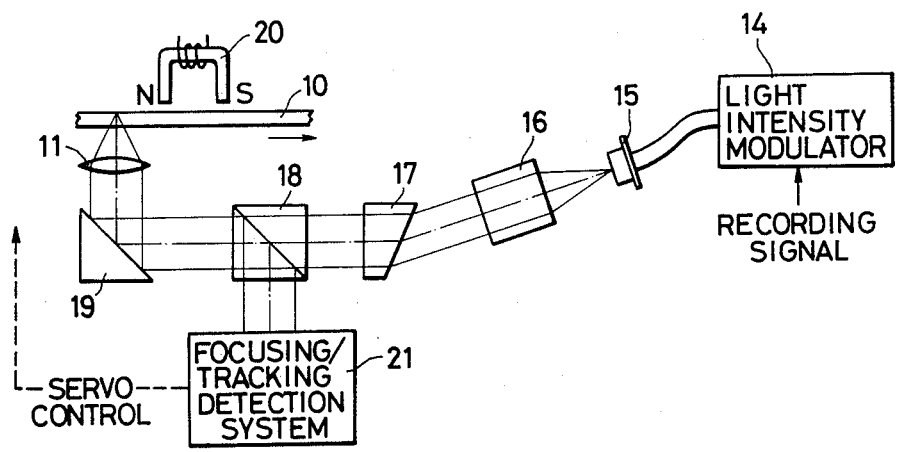
FIG. 2 is a schematic view of an optical arrangement of an overwriting recorder according to an emboidiment of the present invention.

In FIG. 2, a laser beam emitted from a semiconductor laser 15 is converted by a coupling lens 16 to a parallel-ray beam which is directed to a beam splitter 18 by means of a prism 17. The laser beam that has passed through the beam splitter 18 is directed by a deflecting prism 19 toward an objective lens 11, which focuses the laser beam onto the recording surface of a photomagnetic disk 10.

The semiconductor laser 15 is coupled to a light intensity modulator 14 which applies a signal to be recorded to the semiconductor laser 15 to enable the latter to generate a laser beam having a light intensity corresponding to the signal to be recorded. A magnetic head 20 serving as a fixed-field generator is disposed on one side of the photomagnetic disk 10 opposite to the objective lens 11 in confronting relation to the photomagnetic disk 10. The magnetic head 20 has N and S magnetic poles which are disposed at two positions determined by the intensity of the modulated laser beam, i.e., the positions A, B as described with reference to FIG. 1(d), for applying magnetic fields in mutually opposite directions to the disk 10 at these two positions, respectively. The magnetic head 20 is mounted on an optical pickup (not shown) which supports the objective lens 11 and other members.

A light beam reflected from the disk 10 is reflected by the deflecting prism 19, and then reflected by the beam splitter 18 toward a focusing/tracking detection system 21, which generates signals for effecting known focusing and tracking servo control.

In the embodiment shown in FIG. 2, the laser beam emitted by the semiconductor laser 15 is modulated by the signal to be recorded so that the light intensity of the laser beam varies with the signal to be recorded. When the laser beam is of a certain light intensity, the direction of magnetization of the disk 10 is determined at the position of one of the magnetic poles of the magnetic head 20 according to said one magnetic pole. When the laser beam is of the other light intensity, the direction of magnetization of the disk 10 is determined at the position of the other magnetic pole of the magnetic head 20 according to the other magnetic pole. Therefore, a signal already recorded on the disk 10 is erased and, at the same time, the signal which has modulated the laser beam emitted from the semiconductor laser 15 is recorded on the disk 10.

Figure 3:
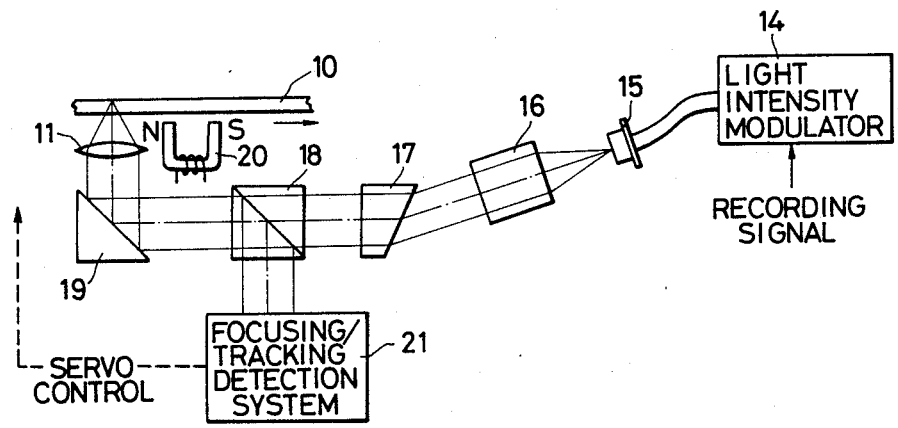
FIG. 3 is a schematic view of an optical arrangement of an overwriting recorder according to another emboidiment of the present invention.

Another embodiment shown in FIG. 3 is essentially the same as the embodiment of FIG. 2 except that a magnetic head 20 serving as a fixed-field generator is disposed on the same side of the photomagnetic disk 10 as that on which the objective lens 11 is located. Since the magnetic head 20 and the objective lens 11 are on one side of the photomagnetic disk 10, the overall arrangement is of a low-profile.

Figure 4:
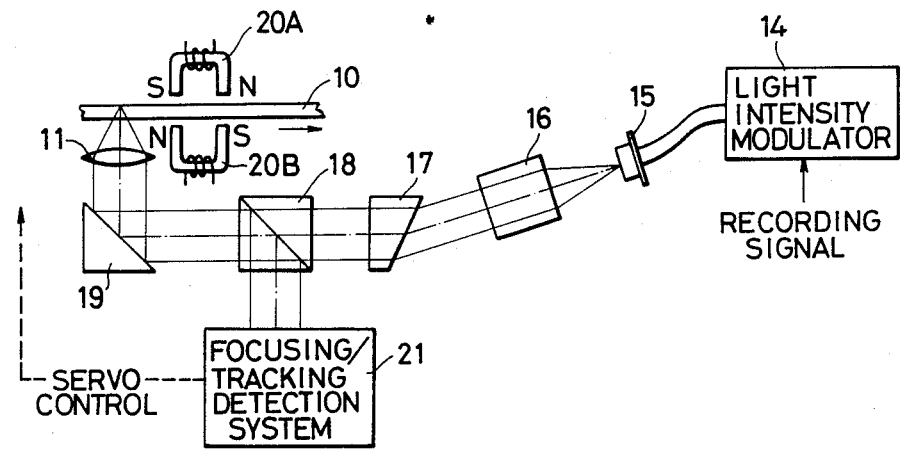
FIG. 4 is a schematic view of an optical arrangement of an overwriting recorder according to still another emboidiment of the present invention.

In still another embodiment shown in FIG. 4, two magnetic heads 20A, 20B as fixed-field generators are disposed in confronting relation to each other, one on opposite sides of the disk 10. Each of the magnetic heads 20A, 20B has two magnetic poles facing respective two positions that are determined by the intensity of the modulated laser beam. The confronting magnetic poles of the magnetic heads 20A, 20B are different or opposite magnetic poles. The other components are the same as those shown in FIG. 2.

The two confronting magnetic heads 20A, 20B jointly form a magnetic circuit for generating a stable magnetic field.

Figure 5:
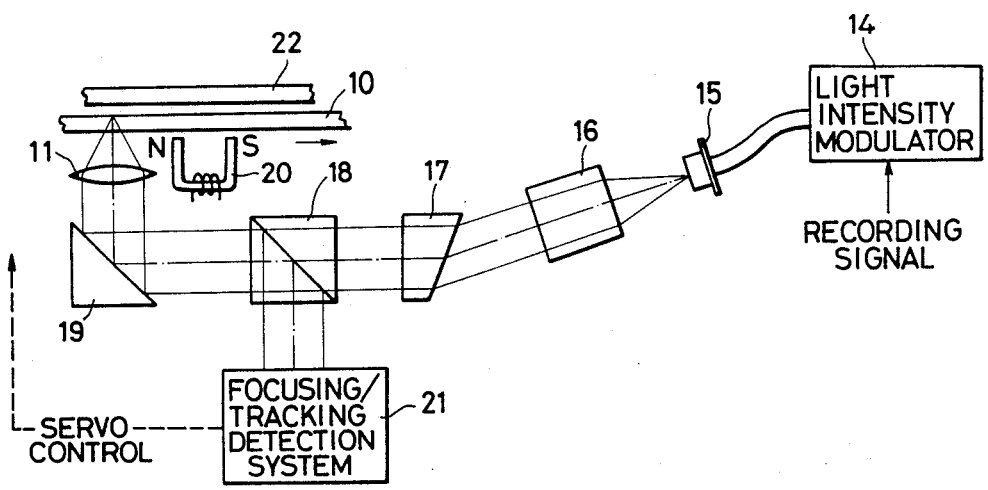
FIG. 5 is a schematic view of an optical arrangement of an overwriting recorder according to a further emboidiment of the present invention.

FIG. 5 shows a further embodiment in which a flat member 22 of highly magnetically permeable material is disposed on the side of the disk 10 which is opposite to the objective lens 11 and the magnetic head 20 that are positioned as shown in FIG. 3. The use of the flat member 22 of highly magnetically permeable material is effective to generate a stable magnetic field, and makes the overall arrangement thinner or lower in profile than the device shown in FIG. 3.

Figure 6:
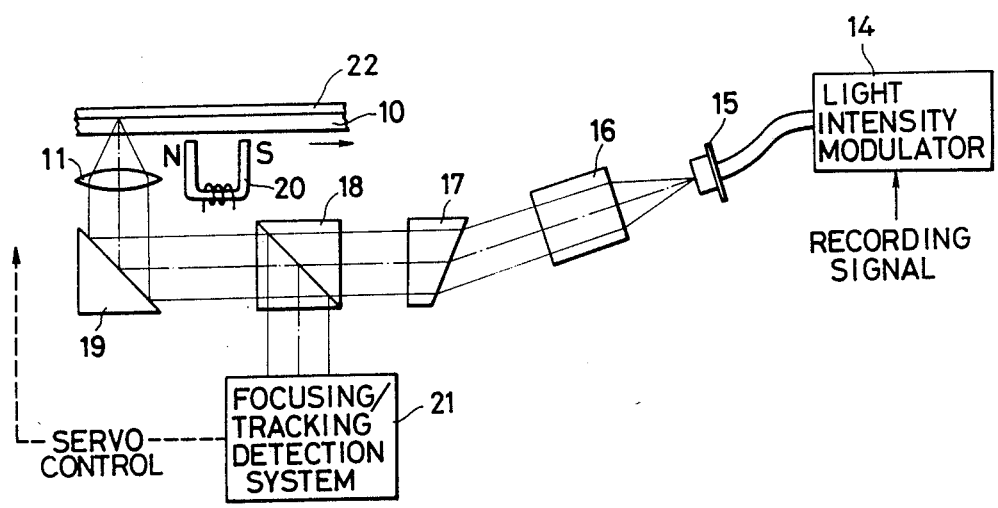
FIG. 6 is a schematic view of an optical arrangement of an overwriting recorder according to a still further emboidiment of the present invention.

A still further embodiment illustrated in FIG. 6 is different from the embodiment of FIG. 5 in that the flat member 22 of highly magnetically permeable material is fixed to the entire surface of the disk 10 which is opposite to the magnetic head 20. The arrangement of FIG. 6 is capable of generating a stable magnetic field and is much thinner or lower in profile.

The magnetic-field generator may comprise a permanent magnet insofar as it can generate magnetic fields in mutually opposite directions at two respective positions determined by the intensity of light modulated. The magnetic head or heads in the illustrated embodiments generate predetermined magnetic fields when electrically energized, and may be an electromagnet or electromagnets.

Although certain preferred embodiments have been shown and described, it should be understood that many changes and modifications may be made therein without departing from the scope of the appended claims.

What is claimed is:

1. An overwriting recorder for use in photomagnetic recording apparatus in which a laser beam emitted from a single semiconductor laser is focused on a moving photomagnetic disk to increase the temperature of the disk and reduce the coercive force thereof for magnetizing the disk according to directions of externally applied magnetic fields thereby to record signals, said overwriting recorder comprising:

a light intensity modulator for modulating said laser beam with a signal to be recorded to obtain light intensities corresponding to the recorder signal; and at least one fixed-field generator, having North and South magnetic poles which are disposed at two positions along the disk moving direction, wherein said field generator is disposed at a location displaced from a location of the focused laser beam on the disk, said generator is for applying said magnetic fields with permanently fixed intensities in mutually opposite directions to the disk at the two positions thereon, said two positions are determined by the light intensities of the modulated laser beam such that the coercive force of said disk varies with time according to the intensities of said modulated light beam and wherein overwriting of data can be achieved.

2. An overwriting recorder according to claim 1, wherein said fixed-field generator comprises:
a magnetic head.

3. An overwriting recorder according to claim 1, further including:
an objective lens for focusing the laser beam on the photomagnetic disk, said objective lens being disposed on one side of said photomagnetic disk, said fixed-field generator being disposed on the side of said photomagnetic disk which is opposite to said objective lens and in confronting relation to said photomagnetic disk.

4. An overwriting recorder according to claim 1, further including an objective lens for focusing the laser beam on the photomagnetic disk, said objective lens being disposed on one side of said photomagnetic disk, said fixed-field generator being disposed on the same side of said photomagnetic disk as said objective lens and in confronting relation to said photomagnetic disk.

5. An overwriting recorder according to claim 1, wherein two fixed-field generators are disposed one on each side of said photomagnetic disk.

6. An overwriting recorder according to claim 1, further including an objective lens for focusing the laser beam on the photomagnetic disk, said objective lens being disposed on one side of said photomagnetic disk, said fixed-field generator being disposed on the same side of said photomagnetic disk as said objective lens and in confronting relation to said photomagnetic disk, and a member of highly magnetically permeable material disposed on the side of said photomagnetic disk which is opposite to said objective lens and said fixed-field generator.

7. An overwriting recorder according to claim 6, wherein said member of highly magnetically permeable material is fixed to an entire surface of said photomagnetic disk.

8. An overwriting recorder according to claim 1, wherein said fixed-field generator comprises a permanent magnet.

* * * * *